United States Patent [19]

Rist, III

[11] 4,092,817

[45] June 6, 1978

[54] FILM APPLYING DEVICE WITH A STRAW-HOLE PERFORATOR

[75] Inventor: Karl Frederick Rist, III, Oakdale, Minn.

[73] Assignee: Minnesota Mining and Manufacturing Company, St. Paul, Minn.

[21] Appl. No.: 763,991

[22] Filed: Jan. 31, 1977

[51] Int. Cl.² .......................... B65B 7/28; B67B 3/04
[52] U.S. Cl. ...................................... 53/298; 53/373; 83/649; 225/52; 225/85
[58] Field of Search ................. 53/128, 133, 290, 296, 53/297, 298, 329, 373; 206/403, 408, 409; 93/1.3; 83/649, 577, 277; 225/52, 75, 74, 84, 85

[56] References Cited

U.S. PATENT DOCUMENTS

| | | | |
|---|---|---|---|
| 2,000,432 | 5/1935 | Anderson | 225/84 X |
| 2,825,406 | 3/1958 | Hagopian | 83/577 |
| 3,184,844 | 5/1965 | Cunningham et al. | 83/577 X |
| 3,286,437 | 11/1966 | Cole | 53/329 X |
| 3,345,797 | 10/1967 | von Stoeser | 53/329 X |
| 3,457,815 | 7/1969 | Cahill | 83/649 X |
| 3,501,896 | 3/1970 | von Stoeser et al. | 53/329 |
| 3,507,093 | 4/1970 | Marion | 53/296 X |
| 3,703,066 | 11/1972 | Marion et al. | 53/296 |
| 3,885,482 | 5/1975 | Denzin | 83/649 X |
| 3,893,382 | 7/1975 | Bosse et al. | 93/33 H |

FOREIGN PATENT DOCUMENTS

| | | | |
|---|---|---|---|
| 541,507 | 5/1957 | Canada | 225/52 |

Primary Examiner—Othell M. Simpson
Assistant Examiner—Horace M. Culver
Attorney, Agent, or Firm—Cruzan Alexander; Donald M. Sell; William L. Huebsch

[57] ABSTRACT

An improvement in a device for advancing an end portion of a strip of heat sealable film along a path from a cartridge to an applying station, sealing the end portion across the lip of a cup and severing the end portion from the strip of film. The device includes a perforating member which cooperates with a support surface in the cartridge before the end portion of the film is advanced to the applying station to perforate around a small portion of the film. The applied film can then be separated along part of the perforations and the small portion can be bent aside to provide an opening through which a drinking straw can be inserted into the cup.

8 Claims, 13 Drawing Figures

FILM APPLYING DEVICE WITH A STRAW-HOLE PERFORATOR

BACKGROUND OF THE INVENTION

This invention relates to devices for advancing an end portion of a supply length of heat sealable film along a path to an applying station, sealing the end portion across the lip of a cup, and severing the applied end portion from the strip of film.

U.S. Pat. Nos. 3,286,437, 3,501,896 and 4,050,971 show such devices. The devices described in U.S. Pat. Nos. 3,286,437 and 4,050,971 however, make no provision for a straw hole in the applied film, so that to insert a straw in a cup sealed by those devices a user must either peel a portion of the film away from the lip of the cup or puncture the film with an implement, either of which procedures are inconvenient and can result in spilling some of the contents of the cup.

Attempts have been made to form an opening (as suggested in U.S. Pat. No. 3,501,896) or perforations in the film at the time it is applied at the applying station by use of a punch mounted at the applying station. The results of such attempts have not been satisfactory, however. The punch becomes heated and collects material from the film and from the food or drink within the cups. This collected material provides a potential source of contamination for the food or drink in cups being sealed, and greatly reduces the cutting efficiency of the punch so that it will not reliably perform its cutting function.

SUMMARY OF THE INVENTION

The present invention provides a device for applying film to the upper lip of a cup of the type described which perforates the film in advance of the application station to provide a small area or portion of the applied film that can be partially separated along the perforations and bent aside to provide an opening sized to receive a drinking straw.

The device according to the present invention includes a perforating member along the path for the film in advance of the applying station, which perforating member has an end adapted to punch perforations in the film defining a small portion of the film which can be separated along the perforations and bent aside to provide an opening adapted to receive a drinking straw. Means are provided mounting the perforating member for movement between a spaced position spaced from the path for the film and an engaged position at which its end portion is in engagement with film along the path to perforate the film. Also a support surface is provided on the side of the path opposite the perforating member which is adapted to support the film for engagement by the perforating member.

Preferably the device is adapted for use with a novel cartridge assembly adapted to be removably mounted on the device, which cartridge assembly includes a housing adapted to provide the support surface on the side of the path opposite the perforating member.

BRIEF DESCRIPTION OF THE DRAWING

The present invention will be more fully understood after a careful reading of the following detailed description which refers to the accompanying drawing wherein like numbers refer to like parts in the several figures, and wherein.

DESCRIPTION OF THE PREFERRED EMBODIMENT

Referring now to FIGS. 1 through 8 of the drawing there is illustrated the prior art device described in U.S. Pat. No. 4,050,971 which does not include the improvement according to the present invention. The device, generally designated by the numeral 10, is adapted for applying rectangular predetermined lengths of a heat sealable film 12 over the open end of a cup such as the cup 15 illustrated from a supply length of the film 12 stored in a cartridge assembly 17.

Briefly, the device 10 comprises means including two clamp assemblies 18 adapted for engaging an end of the supply length of the film 12 at the cartridge assembly 17 and means for advancing the clamp assemblies 18 and an engaged end of the film 12 to an applying station along a path from a first position (FIG. 1) to a second position (FIGS. 4 and 5), which positions are spaced a distance equal to the predetermined length of the film 12 to be applied. Inner and outer circular concentric bosses 22 on a frame 24 of the device 10 are adapted to receive, center and support the base of any one of several sizes of cups with differing heights at the applying station. Means are included for providing relative movement between a cup supported on the bosses 22 and a predetermined length of the film 12 along the path via movement of a head assembly 26 on which the clamp assemblies 18 are movably mounted relative to the frame 24 to bring an annular lip of the cup into full circle engagement with one surface of the predetermined length of film. The device 10 also includes means for applying heat and pressure to fuse the predetermined length of film to the lip of the cup, including a heated platen 30 included in the head assembly 26 and having a pressure surface 29 adapted to press and fuse the film to the lip of the cup. Means comprising a knife 31 is also provided for severing the applied length of film 12 from the supply length at the cartridge assembly 17, thereby cutting the sealed cup loose from the supply length of film 12.

The means for providing relative movement between a cup and a predetermined length of the film 12 comprises two parallel shafts 33 on which the head assembly 26 is mounted by sliding bearings 34 for movement between (1) a spaced position (FIG. 1) at which the platen 30 is spaced from the bosses 22 at a distance somewhat greater than the maximum height of a cup to be sealed to afford insertion of the cup on the bosses 22 under the platen 30 and movement of the clamp assemblies 18 to position a predetermined length of the film 12 between the platen 30 and the cup; and (2) any position within a range of contact positions at which the platen 30 will press the predetermined length of the film 12 positioned between the platen 30 and the cup into engagement with the lip of the cup supported on the bosses 22. A reversible gear motor 35 mounted on the frame 24 drives a rack 36 attached to the head assembly 26 via a gear 37 to move the head assembly 26 between its spaced position and its range of contact positions. Two springs 38 attached between the head assembly 26 and the ends of the shafts 33 help to counteract the weight of the head assembly so that the motor 35 may more easily return the head assembly 26 to its spaced position.

The head assembly 26 comprises a support member 39 in which the sliding bearings 34 are fixed, and the platen 30 to which is fixed a cylindrical rod 40 projecting normally away from its pressure surface 29. The rod 40 is mounted on the support member 39 for axial sliding motion in a direction generally parallel with the shafts 33 and to present the pressure surface 29 so that it will make full circle engagement with the lip on a cup supported on the bosses 22 as the head assembly 26 moves through its range of contact positions. A compressed spring 41 retained around the rod 40 between an inverted U-shaped portion 42 of the support member 39 and a collar 43 biases the platen 30 toward the bosses 22 to a position at which a stop ring 44 fixed to the rod 40 engages the support member 39. Upon forceful engagement of the pressure surface 29 of the platen 30 against the lip of a cup through a length of the film 12 as the head assembly 26 moves through its range of contact positions, the platen 30 and rod 40 will move relative to the support member 39 against the bias of the spring 41 until the spring 41 transfers a predetermined force to the cup via the surface 29 (e.g. 25 to 30 pounds) and a groove in a cam arm 45 carried by the platen 30 moves adjacent to the actuator on a first snap action switch 46 carried by the support member 39. The actuator of the first snap action switch 46 then moves into the groove in the cam arm 45 which pulses an electrical control circuit for the device 10. Upon receiving the pulse, the control circuit stops the motor 35 for a predetermined dwell time and then reverses the motor 35 to return the head assembly 26 to its spaced position. Arrival of the head assembly 26 at its spaced position is signaled to the control system when a second snap action switch 47 fixed to the frame 24 is engaged by the support member 39 so that the motor 35 is again stopped.

Figure 1:
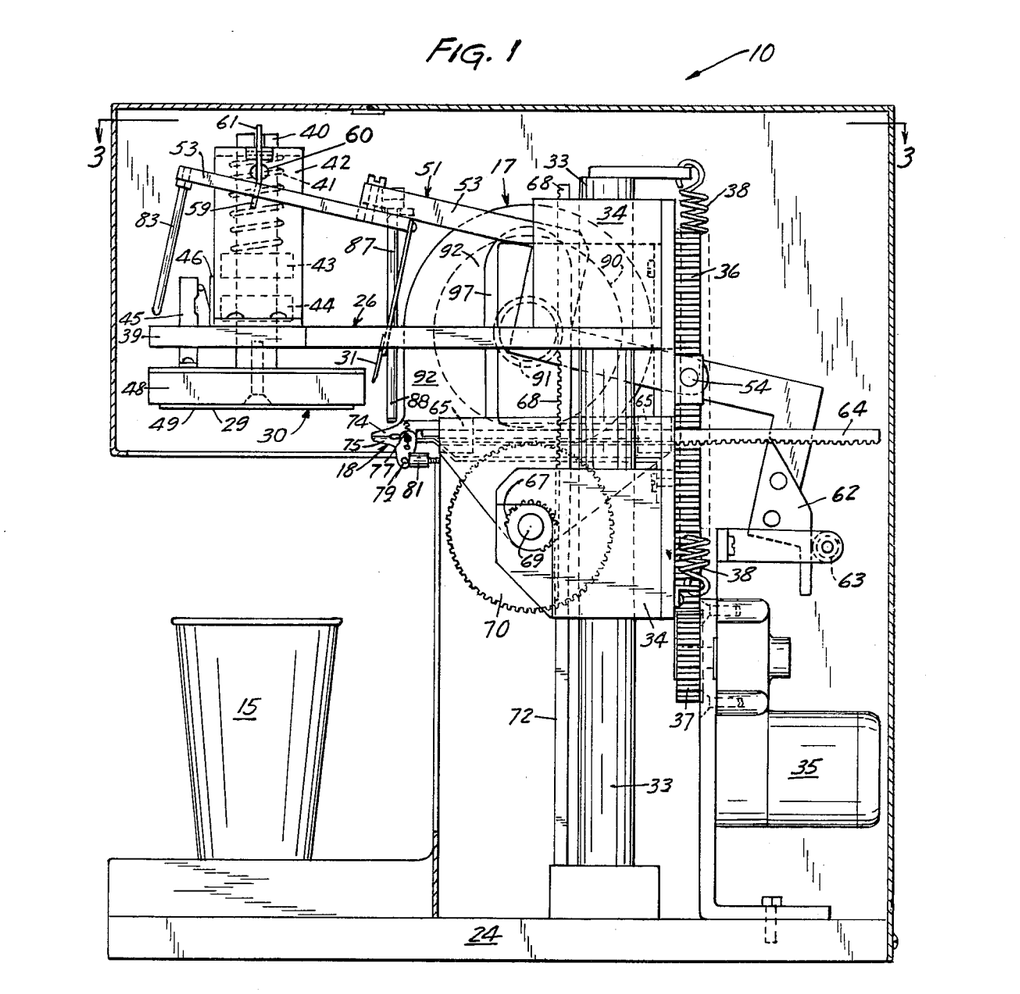
FIG. 1 is a vertical sectional side view having parts broken away to show details of the device described in U.S. Pat. No. 4,050,971 on which the device according to the present invention is an improvement.
Figure 2:
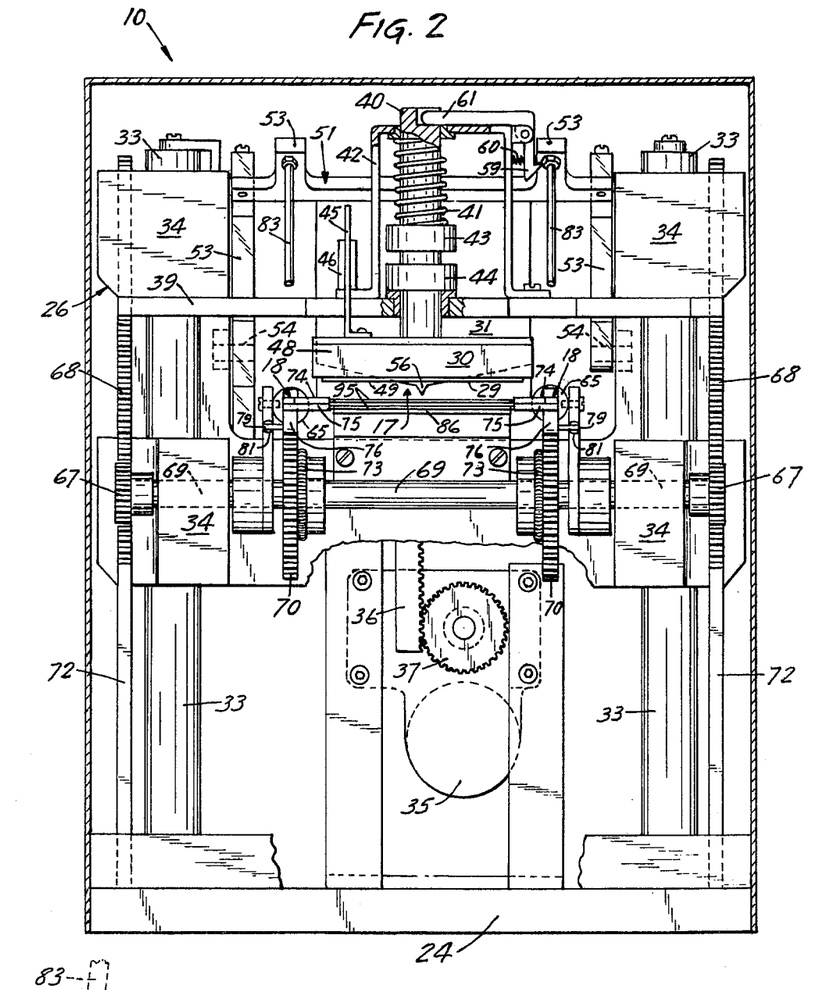
FIG. 2 is a vertical sectional front view of the device of FIG. 1 having parts broken away to show details.
Figure 3:
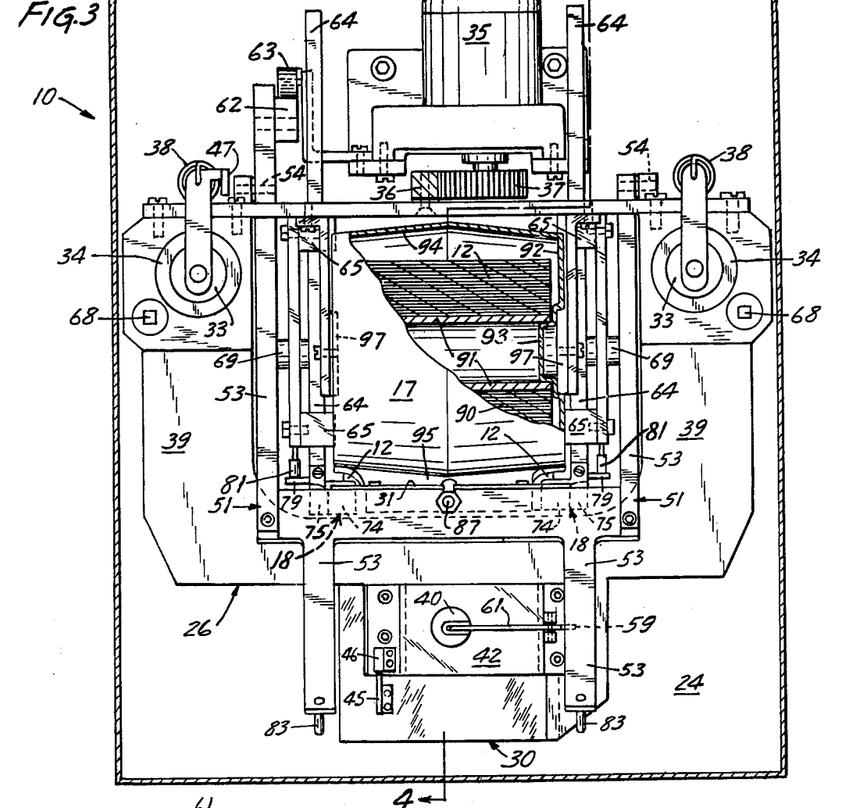
FIG. 3 is a horizontal sectional plan view of the device of FIG. 1 taken approximately along line 3—3 of FIG. 1 and having parts broken away to show details.
Figure 4:
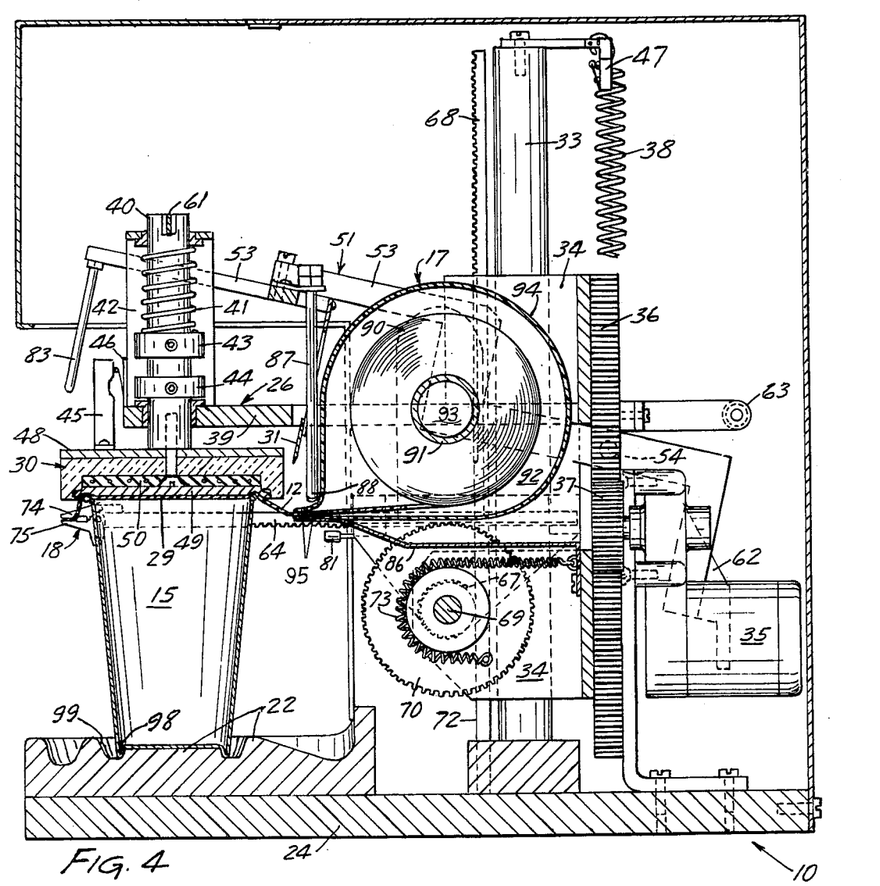
FIG. 4 is a vertical sectional view taken approximately along the line 4—4 of FIG. 3 but shown with a head assembly on the device in a contact position pressing film against a cup in the device.
Figure 5:
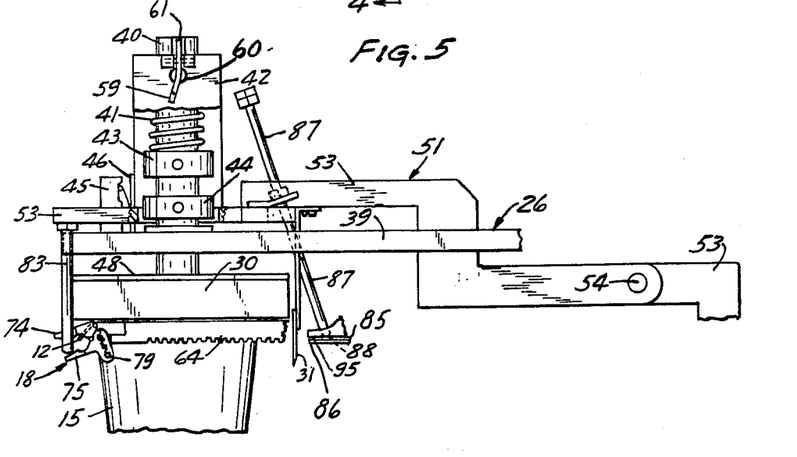
FIG. 5 is a fragmentary view similar to FIG. 3, but shown with a knife on the device in a sever position and a clamp assembly open.

The platen 30 comprises a rectangular metal heat conductive housing 48 to which the rod 40 is attached, and a soft resilient circular pad 49 (e.g. one eighth inch thick about 12 durometer silicone sponge rubber) fixed to the side of the housing 48 opposite the rod 40, which pad 49 defines the pressure surface 29. A thermostatically controlled heater 50 is mounted on the housing 48 and is adapted to produce a sufficiently high temperature on the pressure surface 29 (e.g. 375° F) so that during the predetermined dwell time when the platen 30 presses the film against the cup sufficient heat will be transferred to fuse the film to the cup. The pad is sufficiently soft that during such dwell time it will conform around the lip of the cup, thereby fusing the film to the lip over an arc of at least 30° (said angle being measured on a section taken through the lip of the cup as is illustrated in FIG. 5) and providing much stronger adhesion between the film and the cup than would occur if the film were adhered only tangentially to the upper surface of the cup lip.

The means for severing the film 12 comprises a knife support frame 51 included in the head assembly 26. The knife support frame 51 includes parallel arm portions 53 which fixedly support the knife 31 therebetween and are pivotal on pins 54 fixed to the support member 39. The knife support frame 51 is pivotal between a separated position (FIGS. 1 and 4) at which an edge of the knife 31 is spaced from the path for the film 12, and a sever position at which the knife 31 intersects that path (FIG. 5). The edge of the knife 31 has a pointed outwardly projecting central portion 56 adapted to first engage the film 12 along the path as the knife support frame 51 moves from its separated to its engage position under the influence of gravity, and is shaped to transversely sever the film 12 in both directions subsequent to such engagement as the knife 31 passes through the path. The separated position of the knife support frame 51 is defined by engagement of a hook 59 under one of the arm portions 53. The hook 59 is pivotably mounted on the support member 39 and is biased by a coil spring 60 (FIG. 2) into such engagement. A projecting bar-like portion 61 of the hook 59 has an end resting on the terminal end of the rod 40. Movement of the rod 40 relative to the support member 39 subsequent to engagement of the pressure surface 29 with a cup in the contact position of the head assembly 26 will pivot the hook 59 via the bar-like portion 61 to disengage the hook 59 from the adjacent arm portion 53 and allow the knife support frame 51 and knife 31 to fall to its sever position. Subsequent movement of the head assembly 26 from its contact position back to its spaced position causes a cam 62 attached to an end of one of the arm portions 53 to engage a roller 63 fixed on the frame 24 and pivot the knife support frame 51 back to its separated position at which the hook 59 will again engage and retain the arm portion 53.

The means for advancing the clamp assemblies 18 and an engaged end portion of the heat sealable film 12 along the path comprise a pair of racks 64 having terminal ends to which the clamp assemblies 18 are attached. The racks 64 are slidably mounted through slide bearings 65 fixed on the support member 39 to afford movement of the clamp assemblies 18 between their retracted and extended positions. Such movement is caused during movement of the head assembly 26 between its spaced and its range of contact positions by means including two partially toothed gears 67 each positioned so that certain of its teeth are engaged with teeth on one of two fixed clamp assembly drive racks 68 when the head assembly 26 is in its spaced position. The partially toothed gears 67 are in driving engagement with the racks 64 supporting the clamp assemblies 18 via a shaft 69 rotatably mounted on the support member 39 to which shaft 69 are fixed the partially toothed gears 67 and two gears 70. The number of teeth on the partially toothed gears 67 and the diameters of the gears 67 and 70 are selected so that movement of the head assembly 26 from its spaced position toward its range of contact positions will drive the clamp assemblies 18 from their retracted to their extended positions before the head assembly 26 reaches its range of contact positions. Subsequently when the last tooth of each of the partially toothed gears 67 leaves the associated clamp drive rack 68 it will slide along a planar surface 72 on that clamp drive rack 68, thereby stopping rotation of the partially toothed gears 67 and gears 70 so that the clamp assemblies 18 will not be driven beyond their extended positions no matter how far into the range of contact positions the head assembly 26 subsequently moves. During such sliding movement the last tooth of each of the partially toothed gears 67 is held against the surface 72 of the associated clamp drive rack 68 by one of a pair of coil springs 73 attached between the support member 39 and the gears 70 and positioned so that rotation of the gears 70 to move the clamp assemblies 18 to their extended positions will wrap the springs around the hubs of the gears 70. Upon return movement of the head assembly 26 from its range of contact positions toward its spaced position, the tooth of each of the partially toothed gears 67 sliding along the surface 72 of the associated clamp drive rack 68 will enter the teeth on that clamp drive rack 68 under the influence of one of the coil springs 73 and subsequent engagement between the racks 68 and gears 67 will return the clamp assemblies 18 from their extended to their retracted positions as the head assembly 26 completes its return to its spaced position.

The means for engaging an end of the supply length of film includes means for opening the clamp assemblies 18 at their extended positions to afford release of an applied length of the film 12, and means for again closing the open clamp assemblies to afford engagement of an end portion of the film 12 at the cartridge assembly 17 by the clamp assemblies 18 as the open clamp assemblies 18 move to their retracted positions from their extended positions.

Figure 6:
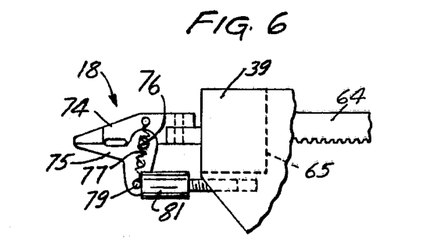
FIGS. 6 and 7 are fragmentary detail views of the clamp assembly in the device of FIG. 1 shown respectively closed and open.
Figure 7:
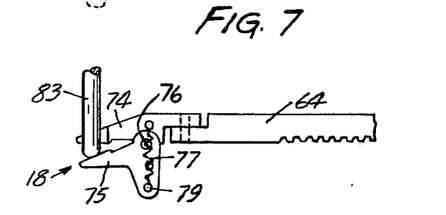
Figure 8:
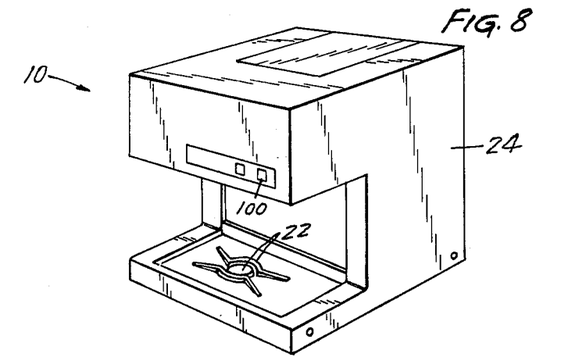
FIG. 8 is a perspective view of the device of FIG. 1.

As is best seen in FIGS. 6 and 7, each clamp assembly 18 comprises a pair of jaws 74 and 75 having projecting terminal ends adapted for engagement on opposite sides of the film 12. One of the jaws 74 of each clamp assembly 18 is fixed to an end of a different one of the racks 64, while its other jaw 75 is pivotably mounted on the fixed jaw 74 at a pivot pin 76. The pivotal jaw 75 is movable to close the clamp assembly 18 and engage the terminal ends of the jaws 74 and 75 on opposite sides of the film 12, and to open the clamp assembly 18 so that the terminal ends of the jaws 74 and 75 are widely spaced and will move over the film 12. A coil spring 77 is tensioned between the jaws 74 and 75 of each clamp assembly 18 in a position so that its line of tension moves to an opposite side of the pivot pin 76 as the jaw 75 moves to open or close the clamp assembly 18, thereby providing a force to releasably retain the clamp assembly 18 either open or closed. A post 79 is fixed to the pivotal jaw 75 of each clamp assembly 18. The post 79 projects parallel to the pivot pin 76 and on the side of the pivot pin 76 adjacent the terminal end of the pivotal jaw 75. A resilient rubber bumper 81 is positioned on the support member 39 to engage the post 79 and move the pivotal jaw 75 to close the clamp assembly 18 as the clamp assembly 18 is moved to its retracted position, thereby causing the clamp assemblies 18 to engage the newly severed end of the film 12 as the clamp assemblies 18 are returned from their extended positions to their retracted positions.

The means for opening the clamp assemblies 18 when the clamp assemblies 18 are in their extended positions comprises two push rods 83 fixed to the distal ends of the arm-like portions 53 of the knife support frame 51. One side of each fixed jaw 74 is relieved to allow the distal end of the adjacent push rod 83 to engage and move the associated pivotable jaw 75 to the open position of the clamp assembly 18 as the knife rack 51 drops to its sever position. Thus the predetermined length of the film 12 fused to the cup is released from the clamp assemblies 18 as it is severed from the supply length of the film 12 in the cartridge assembly 17, and the clamp assemblies 18 are opened for their subsequent return to their retracted positions.

The device 10 also includes means for preventing the supply length of film 12 from being pulled from within the cartridge assembly 17 as the film 12 is severed by the knife 31 due to resistance of the film 12 to severing by the knife 31. A pad 85 of a frictional material (e.g. 220 grit sandpaper) is positioned on a shelf-like portion 86 of the support member 39 for full width contact of the film 12 adjacent the outlet of the cartridge assembly 17. A weighted pressure rod 87 extends through a loose fitting opening in a ring-like member on a cross bar of the knife support frame 51, and has a tip 88 also covered by a frictional material. The rod 87 moves with the knife support frame 51 from a position with its tip 88 closely spaced from the film 12 when the knife support frame 51 is in its separated position, to a position at which the tip 88 of the rod 87 bears against the side of the film 12 opposite that contacted by the pad 85 of frictional material, which position is reached shortly after the knife support frame 51 starts to move from its separated position toward its sever position. The weight of the rod 87 is selected so that the pressure when applied between the rod 87 and pad 85 will restrict movement of the film 12 from within the cartridge assembly 17 as the film 12 is severed by the knife 31.

The cartridge assembly 17 is constructed to insure the cleanliness of the film 12 and afford easy loading of the film 12 into the device 10. The cartridge assembly 17, best seen in FIGS. 1, 3 and 4, comprises a cylindrical roll 90 of the heat sealable film 12 on a core 91, and a housing including end walls 92 having opposed centered cylindrical inwardly extending projections 93 rotatably supporting the core 91 of the roll of film 12. The housing also includes a generally cylindrical wall 94 joining the end walls 92 to enclose the roll of film 12 and having closely spaced ends transverse of the roll of film from which end closely spaced projecting walls 95 extend generally tangentially to the cylindrical wall 94. The projecting walls 95 are relieved adjacent the end walls 92 to afford engagement of the clamp assemblies 18 with the end of the supply length of film 12 supported between the projecting walls 95, and the projecting walls 95 are centrally notched to afford engagement of the tip 88 of the weighted rod 87 to press the film 12 therebetween against the frictional material on the shelf 86. The end walls 92 are also formed with grooves adapted to receive cartridge mating portions 97 of the support member 39 which removably support the cartridge with the projecting walls 95 aligned with the clamp assemblies 18 in their retracted positions.

The film applied by the device 10 could consist of a single material, or be a layered film (e.g. coated, laminated or coextruded film). Suitable films could include a polyester-backed ethylene vinyl acetate copolymer, a thermoplastic coated paper or a polyolefin coated polyester. The main requirement for the film is that a heat sealable material forming at least one of its surfaces will fuse to the lip of a cup to form a tight seal upon the application of moderate pressure and heat, that the film has desired strength and barrier properties, and that the film is suitable for contact by the liquid or material being sealed within the cup. A preferred film comprises polyester coated with an ethylene vinyl acetate copolymer such as that sold under the trade designation "SCOTCHPAK — 112" by the Minnesota Mining and Manufacturing Company of Saint Paul, Minnesota. This film provides good adhesion to the lips of wax coated paper or foamed polystyrene paper laminate cups, and has a very high burst strength which is particularly desirable to restrict spillage when a sealed cup of liquid is tipped over.

The bosses 22 illustrated are especially formed to support and locate the bases of cups of two different diameters. An inner disk-like boss has a peripheral surface 98 adapted to engage and locate the inner surface of a cup having one base diameter, whereas a ring-like boss has an inner surface 99 concentric with and spaced outwardly from the peripheral surface 98 which is adapted to engage and locate the outer surface of a cup having a larger base diameter. Thus, the device can accommodate cups of different diameters as well as cups of different heights.

Operation

For operation, the head assembly 26 is initially positioned in its upper or spaced position. The clamp assemblies 18 are initially closed and are in engagement with an end portion of the film 12 in the relieved areas flanking the projecting walls 95 of the cartridge assembly 18. The knife support frame 51 is raised so that the knife 31 is spaced from the projecting walls 95 of the cartridge assembly 17. To seal a cup, the operator places the base of the cup against the appropriate one of the bosses 22 and presses a button 100 to activate the device 10. Upon such activation a control circuit for the device first starts the motor 35 in a direction to move the head assembly 26 toward the cup via the pinion 37 and rack 36. Such movement causes relative movement between the support member 39 and the clamp drive racks 68 and resulting rotation of each of the partially toothed gears 67 which, via the shafts 69 and gears 70, drive the racks 64 and attached clamp assemblies 18 from their retracted positions to their extended positions at which the engaged film 12 extends along a path adjacent the pressure surface 29 of the heated platen 30. Movement of the clamp assemblies 18 will terminate when they reach their extended positions because the last tooth of each of the partially toothed gears 67 then simultaneously leaves the teeth of the associated clamp drive rack 68 and subsequently those last teeth will slide along the planar surfaces 72 on the clamp drive racks 68 as the head assembly 26 moves into its range of contact positions and the pressure surface 29 engages the cup through the adjacent film 12. When such contact with the cup occurs, the heated platen 30 will move relative to the support member 39 against the bias of the spring 41 which applies force to form the pad 49 around the lip of the cup, until the relieved area of the cam arm 45 mounted on the platen 30 moves adjacent the actuator on the snap action switch 46 mounted on the support member 39. Such positioning allows the actuator to move, thereby causing the snap action switch 46 to pulse the control circuit and stop the motor 35 for a predetermined dwell time during which the heated platen 30 fuses the film 12 to the cup. Also during such movement of the platen 30 relative to the support member 39, the end of the rod 40 to which the platen 30 is mounted will move the hook 59, thereby releasing the knife support frame 51 so that it will fall to both cause the knife 31 to cut the film 12 adjacent the cartridge assembly 17 and cause the push rods 83 to impact and open the clamp assemblies 18.

After the predetermined time for fusing the film 12 to the cup has elapsed, the control circuit activates the motor 35 in a reverse direction, thereby causing the head assembly 26 to move back to its spaced position. During such movement, the last tooth of each of the partially toothed gears 67 again engages the teeth of the rack 64 under the influence of one of the springs 73 which were wound around the hubs of the gears 70 as the gears 70 drove the clamp assemblies 18 to their extended positions. Movement of the head assembly 26 subsequent to such engagement moves the clamp assemblies 18 back to their retracted positions adjacent which the jaws of the open clamp assemblies 18 first pass on opposite sides of the film 12 in the projecting walls 95 of the cartridge assembly 17 and the posts 79 then engage the bumpers 81 which close the clamp assemblies 18 in readiness for the next application. Also during movement of the head assembly 26 back to its spaced position, the surface of the cam 62 on the knife support frame 51 moves along the roller 63 mounted on the frame 24, causing the knife support frame 51 to move back to its spaced position where it is retained by re-engagement of the hook 59 under the influence of the coil spring 60.

Present Invention

Figure 9:
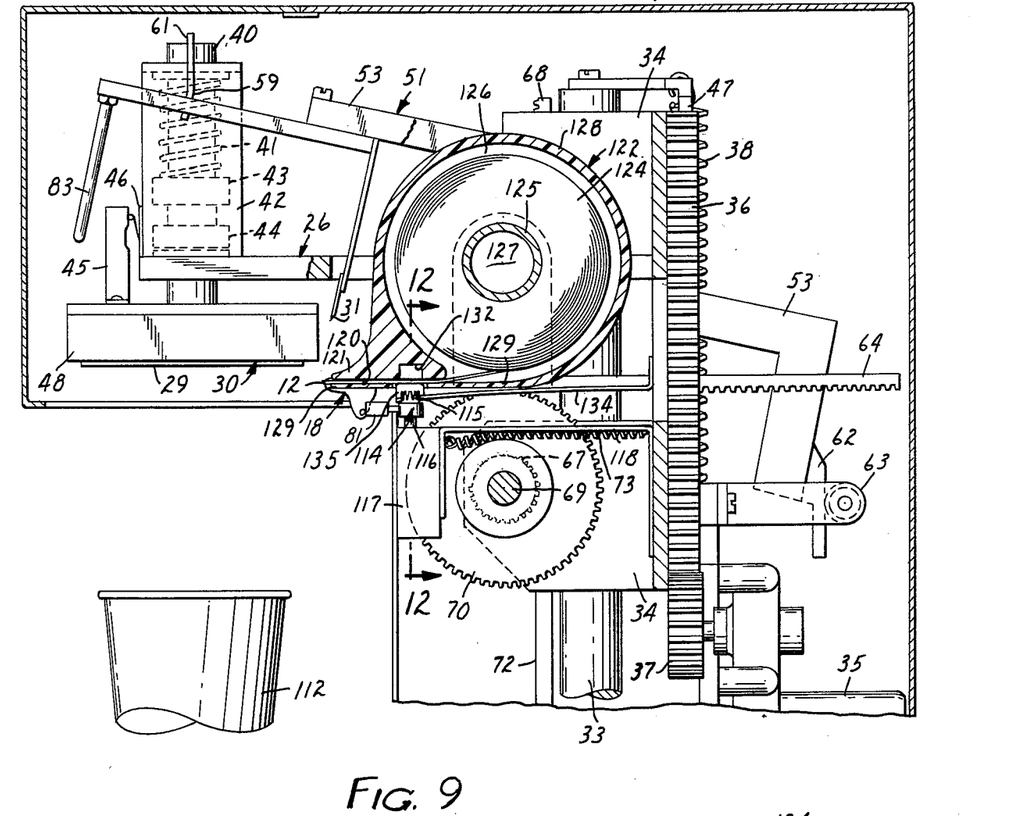
FIGS. 9, 10 and 11 are fragmentary views partially in section of the device illustrated in FIGS. 1 through 8 which device includes the improvements according to the present invention, and which views sequentially illustrate its operation.
Figure 10:
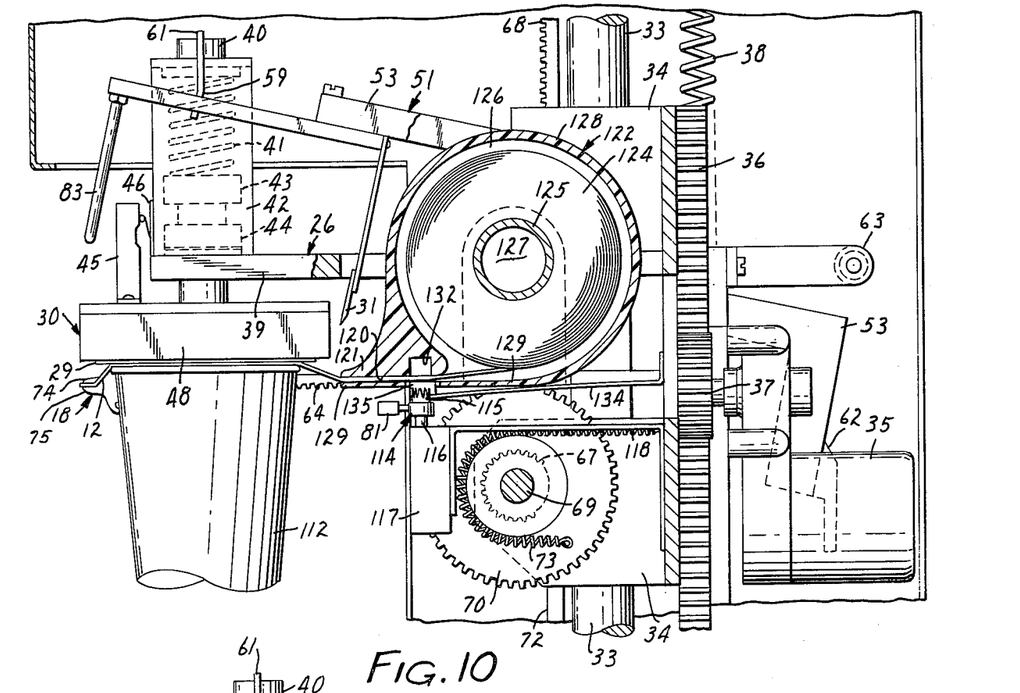
Figure 11:
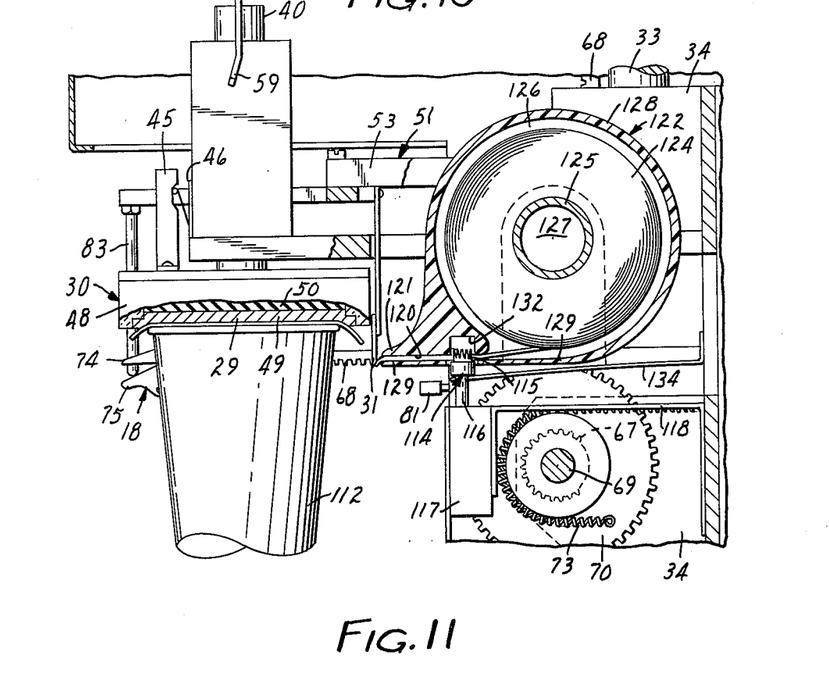
Figure 13:
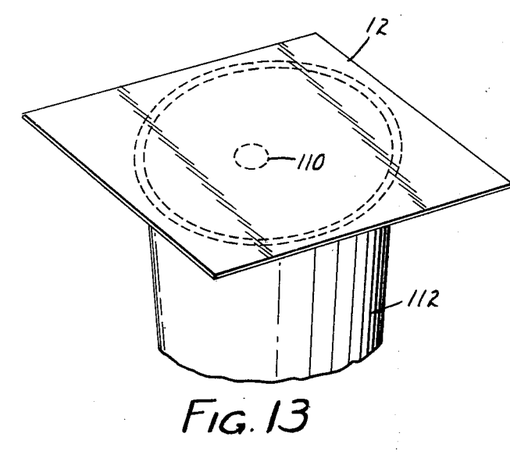
FIG. 13 illustrates a cup having a piece of film attached over its lip which film has been perforated by the device including the improvements according to the present invention.

FIGS. 9, 10 and 11 illustrate the improvements according to the present invention in the device 10 and in the cartridge assembly for use therein. These improvements provide means along the path for the strip material in advance of the first position for perforating the film 12 to provide a small portion of the film or area 110 (FIG. 13) which can be partially separated from the rest of the film along the perforations and bent aside to provide an opening adapted to receive a drinking straw through the end portion of the film applied to a drinking cup 112.

As is seen in FIGS. 9, 10, 11 and 12, these means comprise a perforating member 114 having an end portion 115 adapted to punch a circular ring of perforations in the film 12 to provide the small area 110. The perforating member 114 is mounted at the end of a plunger 116 in an electrical solenoid 117 attached via a U-shaped bracket 118 to the support member 39. The plunger 116 is normally retracted under the influence of a spring (not shown) incorporated in the solenoid 117 to a first or spaced position spaced from the path for the strip material. Activation of the solenoid 117 will cause movement of the perforating member 114 from its spaced position to an engaged position with the end portion 115 intersecting the path to cause perforations in the film 12.

As illustrated the end portion 115 is a hollow cylindrical member having axially projecting teeth on its distal end which teeth are pointed and sharpened along their edges so that they can cut a circle of perforations in the film to provide the small area 110. Alternatively the end portion could assume any of a number of shapes (e.g. oval, triangular or square) to provide a desired shape for such a small area which is partially or totally bounded by perforations.

The means for perforating also include a support surface 120 along the side of the path opposite the perforating member 114 for supporting the film as the teeth on the end portion 115 engage the film 12. Preferably this surface 120 is provided by a wall 121 included in a novel cartridge assembly 122 adapted to cooperate with the perforating member 114 to perforate the film 12.

The cartridge assembly 122 illustrated in FIGS. 9, 10, 11 and 12, like the cartridge assembly 17 illustrated in FIGS. 1 through 8, comprises a cylindrical roll 124 of the heat sealable film 12 on a core 125, and a housing including end walls 126 having opposed centered cylindrical inwardly extending projections 127 rotatably supporting the core 125 for the roll 124 of film 12. The housing also includes a generally cylindrical wall 128 joining the end walls 126 to enclose the roll of film 12. The cylindrical wall 128 has closely spaced ends extending transverse of the roll of film from one of which ends projects the wall 121 and from the other of which projects a lower wall 129 closely spaced from the upper projecting wall 121. The walls 121 and 129 project generally tangentially to the cylindrical wall 128 and define an exit slot for the film therebetween. The projecting walls 121 and 129 are relieved adjacent the end walls 126 to afford engagement of the clamp assemblies 18 with the end of the supply length of film 12 supported between the projecting walls 121 and 129. The end walls 126 are formed with grooves adapted to receive cartridge mating portions 97 of the support member 39 which removably support the cartridge with the exit slot for the film 12 between the projecting walls 121 and 129 aligned with the clamp assemblies 18 in their retracted position.

Figure 12:
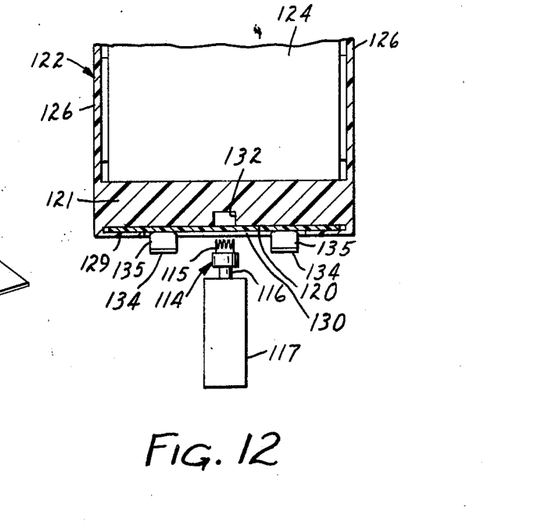
FIG. 12 is a sectional view taken approximately along the line 12—12 of FIG. 9.

Unlike the cartridge assembly 17, however, in the improved cartridge assembly 122 according to the present invention the lower projecting wall 129 is relieved to provide a passageway 130 through which the perforating member 114 moves into engagement with the film 12 between the projecting walls 121 and 129 (see FIG. 12). The upper projecting wall 121 provides the support surface 120 on the side of the film path opposite the perforating member 114 which will support the film as it is engaged by the perforating member 114, and has an opening 132 into which the toothed end portion 115 of the perforating member 114 will project when it moves to its engaged position.

The control circuit is connected to the solenoid 117 to momentarily activate the solenoid to perforate the film when the button 100 is pressed to activate the device, thus providing means for operating the means for perforating before the motor 35 is started to operate the means for advancing the clamp assemblies 18 and an engaged end of the film to the applying station.

Along with adding the perforating member 114 and using the novel cartridge structure described above, the improvements according to the present invention in the device 10 also include the addition of means for continuously restricting movement of the film along the path which replace the rod 87 and shelf 86 supporting the pad 85 of frictional material in the device as illustrated in FIGS. 1 through 8. These added means not only insure that the film will be cleanly severed by the knife 31 without pulling film 12 from the cartridge assembly 122 as did the rod 87 and shelf 86, but also insure that the film will be somewhat tensioned along the path as the film 12 is advanced from the first to the second position to further restrict wrinkles in film applied to the lip of a cup.

The means for continuously restricting movement of the film along the path comprises two resilient flexible arms 134 projecting from the support member 39, which arms 134 support upwardly projecting members 135 of frictional material (e.g. rubber). The arms 134 position the projecting members 135 in the passageway 130 on either side of the opening and bias the members 135 so that their ends engage the film and press it against the support surface 120. The drag on the film 12 provided by the members 135 provides the means for continuously restricting movement of the film out of the cartridge assembly 122 and along the path.

I claim:

1. In a device for applying predetermined lengths of a heat sealable film over the open ends of cups from a supply length of the film, said device comprising: means adapted for advancing an end of a said strip of heat sealable film along a path from a first position to a second position, said positions being spaced a distance equal to said predetermined length; means adapted for supporting a said cup in said device; means for providing relative movement between said means adapted for supporting and a said predetermined length of the film extending between said first and second positions, said means for providing relative movement being adapted to bring the lip of the cup into full circle engagement with one surface of the predetermined length of film; means for applying heat and pressure to fuse said predetermined length of film to the lip of said cup when the predetermined length of film is in engagement with the cup; and means for severing the applied predetermined length of film from the supply length of film, the improvement wherein said device further comprises means along said path in advance of said first position for perforating said film to provide a small area of the film which can be separated along the perforations and bent aside to provide a hole in the film adapted to receive a drinking straw, and means for operating said means for perforating before operation of said means for advancing to provide a said small area in each predetermined length of film applied to a cup.

2. A device according to claim 1, wherein said means for perforating said film comprises a perforating member having an end adapted to punch said perforations in said film and mounted on said device for movement between a spaced position spaced from said path and an engaged position with said end intersecting said path, and a support surface along the side of said path opposite said perforating member adapted to support said film around the area engaged by the end of said perforating member.

3. A device according to claim 2, wherein said device comprises a removable cartridge assembly including a roll of said heat sealable film, a housing having an outlet opening, means for rotatably mounting said roll of heat sealable film within said housing, and a portion along the side of said path opposite said perforating member providing said support surface for supporting said film around the area engaged by the end of said perforating member.

4. A device according to claim 3, wherein said cartridge housing comprises spaced opposed end walls, a generally cylindrical wall joining the end walls to enclose said roll of film and having closely spaced ends transverse of said roll of film, and two closely spaced walls projecting generally tangentially to said cylindrical wall from the ends of said cylindrical wall and defining an outlet slot therebetween for said film, one of said projecting walls having a passageway and being positioned to afford engagement of the end portion of said perforating member with said film between said projecting walls through said passageway, and the other of said projecting walls being adapted to provide said support surface and having an opening adapted to receive the end of said perforating member.

5. A device according to claim 1, further including means for continuously restricting movement of the film along said path comprising a member of frictional material, and means for biasing said member to press film along said support surface against said support surface.

6. A cartridge assembly comprising a roll of heat sealable film, a housing having an outlet opening for an end of said film, and means for rotatably mounting said roll of heat sealable film within said housing, said cartridge assembly being adapted for use in a device for applying predetermined lengths of the heat sealable film over the open end of a cup, which device comprises means for advancing an end of said strip of heat sealable film along a path from a first position to a second position, said positions being spaced a distance equal to said predetermined length; a perforating member having an end adapted to punch perforations in said film to provide a small portion of the film which can be separated along the perforations and bent aside to provide a hole in the film adapted to receive a drinking straw; means for mounting said perforating member along said path in advance of said first position for movement between a spaced position with said end spaced from said path, and an engaged position with said end intersecting said path; means adapted for supporting a said cup in said device; means for providing relative movement between said means adapted for supporting and a said predetermined length of the film extending between said first and second positions, said means for providing relative movement being adapted to bring the lip of the cup into full circle engagement with one surface of the predetermined length of film; means for applying heat and pressure to fuse said predetermined length of film to the lip of said cup when the predetermined length of film is in engagement with the cup; and means for severing the applied predetermined length of film from the supply length of film, said cartridge assembly including a portion adapted to be positioned along the side of said path opposite said perforating member and to support said film in the area engaged by the end of said perforating member, and having an opening adapted to receive said end upon movement of said perforating member to said engaged position.

7. A cartridge assembly according to claim 6, wherein said housing comprises spaced opposed end walls, a generally cylindrical wall joining the end walls to enclose said roll of film and having closely spaced ends transverse of said roll of film, and two closely spaced walls projecting generally tangentially to said cylindrical wall from the ends of said cylindrical wall and defining said opening therebetween for said film, one of said projecting walls having a passageway and being positioned to afford engagement of the end portion of said perforating member with said film between said projecting walls through said passageway, and the other of said projecting walls being adapted to provide said support surface and having said opening.

8. A cartridge assembly according to claim 7, wherein said device further includes means for continuously restricting movement of the film along said path comprising a member of frictional material and means for biasing said member to press film along said support surface against said support surface, said passageway in said projecting wall being adapted to receive said member adjacent said perforating member.

* * * * *